(12) United States Patent  
Gavelle et al.

(10) Patent No.: US 8,229,502 B2
(45) Date of Patent: Jul. 24, 2012

(54) MOBILE COMMUNICATIONS DEVICE, CONTROLLER, AND METHOD FOR CONTROLLING A MOBILE COMMUNICATIONS DEVICE

(75) Inventors: Sylvain Gavelle, Toulouse (FR); Fabrice Cotdeloup, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 396 days.

(21) Appl. No.: 12/441,313

(22) PCT Filed: Sep. 25, 2006

(86) PCT No.: PCT/IB2006/054085
§ 371 (c)(1),
(2), (4) Date: Mar. 13, 2009

(87) PCT Pub. No.: WO2008/038071
PCT Pub. Date: Apr. 3, 2008

(65) Prior Publication Data
US 2009/0305739 A1 Dec. 10, 2009

(51) Int. Cl.
*H04M 1/00* (2006.01)
(52) U.S. Cl. ............ 455/556.1; 455/556.2; 348/370; 348/371

(58) Field of Classification Search ........... 455/556.1, 455/556.2, 557, 575.1, 575.3, 575.4, 575.8, 455/550.1; 348/333.06, 370, 371
See application file for complete search history.

(56) References Cited

U.S. PATENT DOCUMENTS

| | | | |
|---|---|---|---|
| 6,119,023 A | 9/2000 | Tomiyori | |
| 6,681,120 B1 * | 1/2004 | Kim | 455/556.1 |
| 6,775,361 B1 * | 8/2004 | Arai et al. | 379/93.17 |
| 7,085,489 B2 * | 8/2006 | Yamashita | 396/157 |
| 2005/0215296 A1 * | 9/2005 | Fujihara et al. | 455/575.3 |
| 2005/0231632 A1 * | 10/2005 | Sekikawa et al. | 348/370 |
| 2007/0298850 A1 * | 12/2007 | Miyata et al. | 455/575.3 |

FOREIGN PATENT DOCUMENTS

| | | | |
|---|---|---|---|
| EP | 1359779 A | 11/2003 | |
| EP | 1689148 A | 8/2006 | |
| GB | 2313741 A | 12/1997 | |
| GB | 2356967 A | 6/2001 | |

* cited by examiner

*Primary Examiner* — Cong Tran

(57) ABSTRACT

A mobile communications device. includes a communication unit for communicating with another device. The mobile communications device further has a communication unit for communicating with another device and at least one other component. A controller is connected to the communication unit and the component. The controller can control the component, during at least a part of time the communication unit is in a communicating mode, based on an operation of the communication unit.

19 Claims, 3 Drawing Sheets

MOBILE COMMUNICATIONS DEVICE, CONTROLLER, AND METHOD FOR CONTROLLING A MOBILE COMMUNICATIONS DEVICE

FIELD OF THE INVENTION

This invention relates to a mobile communications device, to a controller, to a method for controlling a mobile communication device and to a kit of parts.

BACKGROUND OF THE INVENTION

Mobile communication devices, such as mobile telephones provided with a camera are known. The mobile telephone has a camera which can capture an image of an object and a flash-light which can generate a light flash in order illuminate the object when the camera generates the image. The mobile telephone further has a transceiver which can transmit and receive radio signals. The transceiver is connected to a power source, a 1000 mAh lithium-based chemical battery, which provides power to the transceiver.

However, a disadvantage is that the light source and the transceiver can not operate simultaneously. The transceiver includes a power amplifier which uses about 1 A of current during peak operation, whereas the light source typically draws a peak current of 1 A from the battery during the flash. In case the peak current from the power amplifier and the light source occurs simultaneously, the battery has to deliver a current of several amperes during several milliseconds. This amount of current may cause a drop in the supply voltage due to the internal resistance of the battery, the resistance of the battery contacts and other resistances in the path between the battery and the electronic components in the phone, which could cause a crash of the software running on the mobile telephone.

Accordingly, to operate the light source and the transceiver simultaneously additional measures are required. A possible solution is to include 'super' capacitors in the transceiver to provide the amount of current required to operate the flash light and the transceiver simultaneously. However, a disadvantage is that capacitors occupy a large amount of space. Accordingly, the transceiver would be relatively large. Furthermore, in case the transceiver is implemented as an integrated circuit, the capacitors would increase the amount of substrate area required for the circuit. This increases the costs of the circuit significantly, since the substrate area is a significant factor in the costs of an integrated circuit. Also, the 'super' capacitors introduce complex mechanical constraints.

SUMMARY OF THE INVENTION

The present invention provides a mobile communications device, a controller, a method for operating a mobile communication device and a kit of parts as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
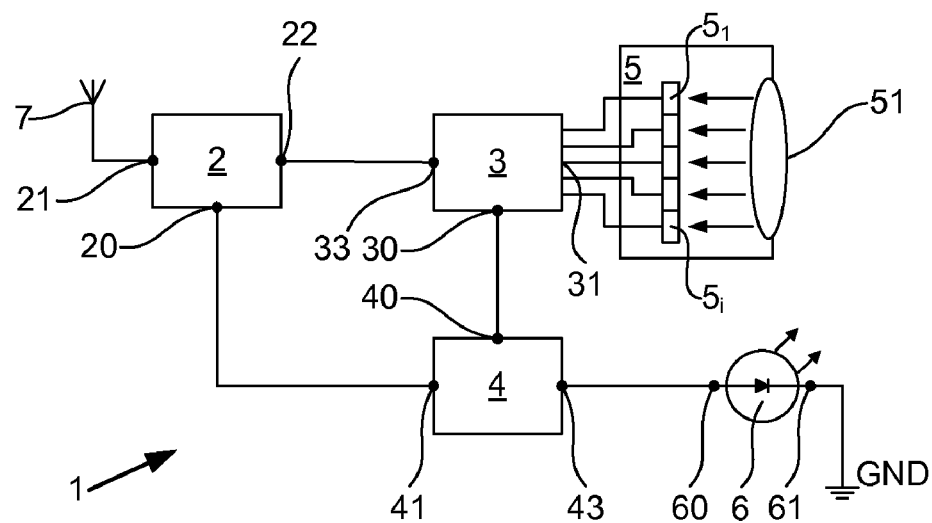
FIG. 1 schematically shows a block diagram of an example of an embodiment of a mobile communications device.
Figure 2:
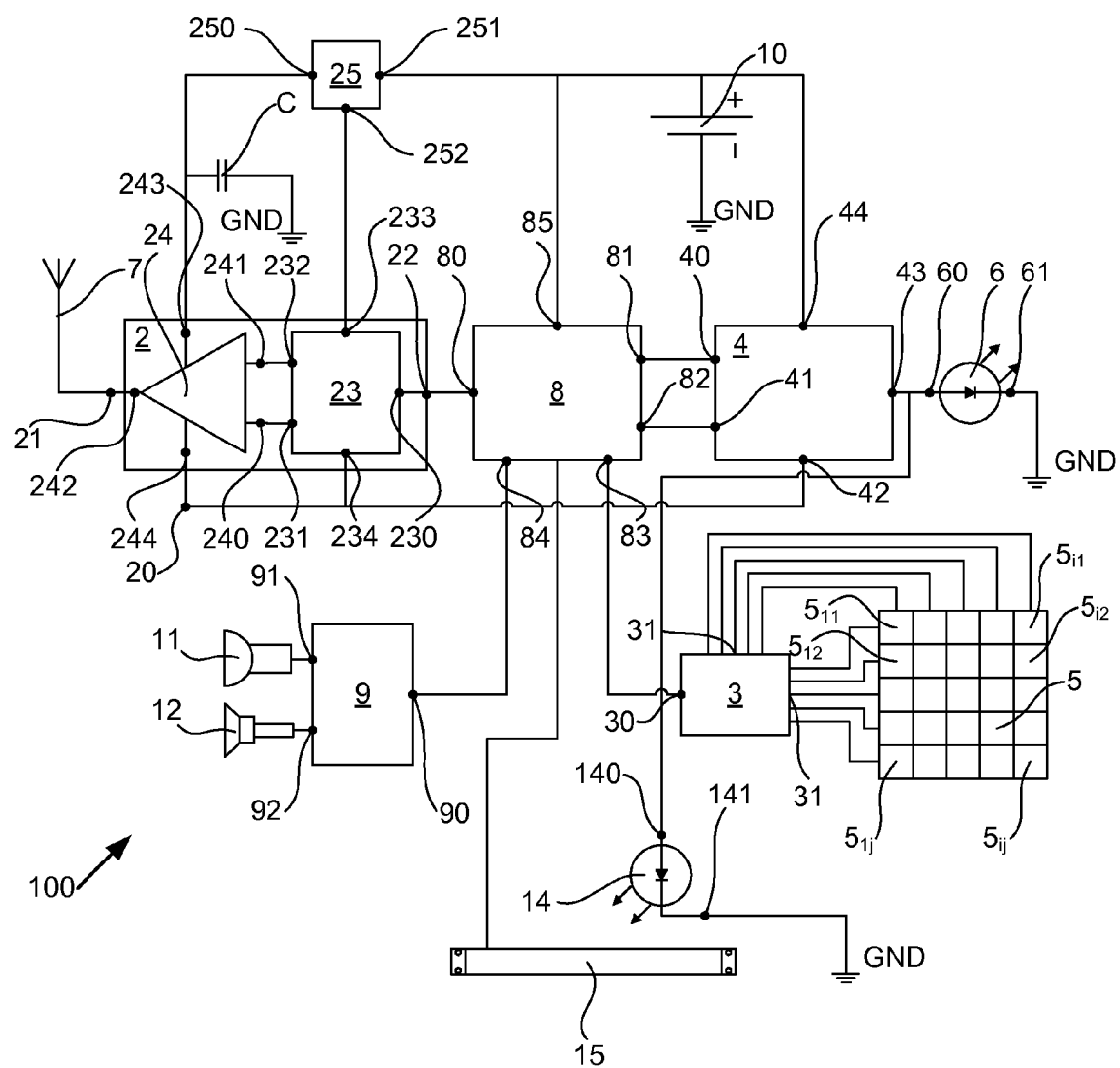
FIG. 2 schematically shows a block diagram of another example of an embodiment of a mobile communications device.

FIG. 1 and FIG. 2 schematically show block diagrams of examples of a mobile communications device 1. The mobile communication device may, as shown in FIG. 1 and FIG. 2, include a communication unit 2 and one or more other components such as a back light source 14, and/or a display 15, and/or a camera 5 and/or a light source 6. The mobile communication device 1 may further include one or more controllers, such as for example a camera controller 3 and/or a light source controller 4.

As shown in FIGS. 1 and 2, one or more of the controllers 3,4 may be connected to the communication unit 2 and to one or more of the other components. For instance, in the example of FIG. 2, the light source controller 4 is connected to the communication unit 2 and respective light sources 6, 14. The light source controller 4 can control the light sources 6,14 during at least a part of a time the communication unit 2 is in a communicating mode based on an operation of the communication unit 2.

The light source controller 4 may for instance be connected to a control output 20 of the communication unit 2 to determine a state of the communication unit 2 and be connected to respective control inputs 60,140 of the one or more other components (e.g. of the light sources 6,14) in order to change a state of the component, when the communication unit 2 enters into a predetermined state during at least a part of the communicating mode, from a first state to a second state at which the component has a lower energy consumption than in the first state. For example, during the communicating mode, the communication unit 2 may for instance be in a transmitting state in which the communication unit 2 transmits signals to the other device or in a non-transmitting state (e.g. in a receiving state or in a sleeping state) in which the communication unit 2 does not transmit signals to the other device. The controller may then control, for example, the other components based on whether the communication unit 2 is in the transmitting state or a non-transmitting state. For instance, the light source controller 4 may switch the light sources 6,14 to a less bright mode.

The mobile communications device 1 may for example include one or more components from the group consisting of: back light, display, camera, light source, microphone, speaker, voice processor communication processor, baseband processor. The components other than the communication unit 2 may, for example, be components not required to transmit signals. E.g. such as components providing other functionality than voice communication, such as the light source, the camera, the back light, or the display.

As shown in FIG. 2, the mobile communications device 1 may for example include a display 15 at which information can be outputted visually. For example, data, images, video or other visual information may be outputted at the display 15 by a processor 8. The mobile communications device 1 may include a back light 14 which projects light onto a back side from the display 15, in order to illuminate the side of the display facing a user and thereby enhance the legibility of the display 15.

As shown in FIGS. 1 and 2, the mobile communications device 1 may for example include a camera 5 which can capture an image of an object (or of a number of objects). A camera controller 3 may, as shown in FIG. 1, be connected to the camera 5. In the example of FIG. 1, for instance, a camera control output 31 of the camera controller 3 is connected to the camera 5. The camera controller 3 may control one or more parameters of the camera 5, such as the timing of capturing an image by the camera 5, the sensitivity of the camera 5 to light, the zoom of the camera 5, the focal plane of the camera 5 or other suitable parameters.

In order to enable the camera 5 to capture an amount of light from an object sufficient to capture the image, the light source 6 can illuminate the object by projecting light on the object. The light source controller 4 may be connected to the light source 6. As shown in FIG. 1, for instance, the light source controller 4 may be connected with a control input 60 of the light source 6. The light source controller 4 can control one or more parameters of the light source 6, such as the operating mode of the light source 6, the amount of power used by the light source 6, the period of time during which light is projected or any other suitable parameter.

The communication unit 2 may communicate with another device, for example over a wireless connection. The communication unit 2 may for instance have a communication mode in which the communication unit 2 communicates with another device and a non-communication mode in which the communication unit 2 does not communicate.

For example, when switched into the communication mode, the communication unit 2 may establish a communication channel over a wired or wireless connection, e.g. a radio connection. The communication unit 2 may for example establish the communication channel according to a communication protocol, such as define by the Global System for Mobile communication (GSM) standard, or a standard in the IEEE 802 series, such as the 802.11 series. When establishing the communication channel, the communication unit 2 may for instance be configured according to instructions received from another device, such as a base station of a mobile telephone network. When switched into the non-communication mode, the communication unit 2 may close the communication channel, and for instance be reconfigured. The communication channel may for example be a bi-directional channel via which the communication unit 2 may transmit and/or receive signals.

The communication unit 2 may for example be in the communicating mode during a voice call, and be in a non-communicating mode before and after the voice call (when, for instance, the mobile communication device 1 is not used for communication but for example to run software applications, such as a game application or a calendar application). For example, the communication unit 2 may alternate in the communicating mode between a transmitting state in which signals are transmitted by the communication unit 2 and a receiving state in which signals are receiving by the communication unit 2. The communication unit 2 may for example allocated a certain period of time to transmit and a certain period of time to receive signals by a base station or other network controlling device. For example, in a wireless communication networks, such as GSM, a mobile communications device typically is assigned a certain period of time to receive signals and to transmit signals.

In the examples of FIGS. 1 and 2, for instance, the communication unit 2 is connected, with a signal output 21, to an antenna 7 and can receive and/or transmit electromagnetic signals, such as radio signals, over a (not shown) wireless connection to another device, such as a base station of a mobile telephone network. The communicating mode of the communication unit 2 may include a transmitting state in which the communication unit 2 transmit signals to the other device and a non-transmitting state in which the communication unit 2 does not transmit signals (but for example receives signals) to the other device. The light source controller 4 may be arranged to control the light source 6 to be in a first state when the communication unit 2 is in the transmitting state, and control the light source 6 to be in a second state when the communication unit 2 is in the non-transmitting state, such that in the first state the light source 6 emits less light than in the second state.

The light source controller 4 may for example control the light source 6 and/or the backlight 14 during at least a part of the communicating mode of the communication unit 2 based on an operation of the communication unit 2 and on an operation of the camera 5. Thereby, for example, the light source 6 may be prevented from affecting the communication between the mobile communications device 1 and another device. Also, for example, the need to provide additional circuitry, such as capacitors, to enable the light source 6 and/or the backlight 14 to use the same power source as the communication unit 2 may be obviated. For instance, as is explained below in more detail with reference to FIG. 3, the light source controller 4 may control the light source 6 to emit light depending on the power consumption of the communication unit 2 when the communication unit 2 is in the communicating mode. Without whishing to be bound to any theory, it is found that with such a control, an effective illumination of the object may be obtained without adversely affecting the operation of the communication unit 2. For instance, an excessive consumption of power from a power source may be prevented by controlling the power consumption of the light source 6 such that the power consumption of the light source 6 is reduced when the power consumption of the communication unit 2 increases during the communication mode or vice versa.

Figure 6:
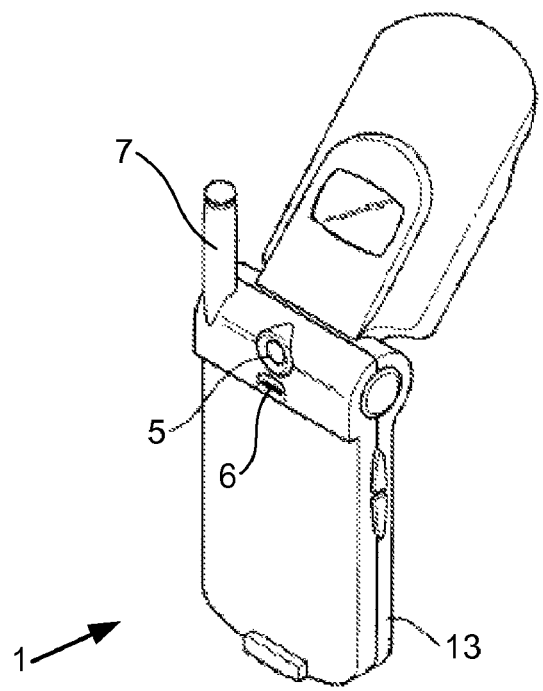
FIG. 6 schematically shows a perspective view of an example of a mobile communications device in which the examples of FIGS. 1 and 2 may be implemented.

As shown in FIG. 6, the mobile communications device 1 may include a housing 13 in which at least a part of the units shown in FIG. 1 (or the units shown in FIG. 2) may be provided. In the example of FIG. 6, the housing 13 has a passage in which a part of the camera 5 is placed, more in particular an optical element, such as lens, which can guide light from the object onto light sensitive elements, such as charge coupled devices. The light source 6 may for example be mounted in the housing 13, such that the light generated by the light source 6 is projected in the viewing direction of the camera 5. In the example of FIG. 6, for instance, the light source 6 is present in a passage in the housing 13 and can project at least a part of the light in a focussing direction of the optical element, and hence illuminate objects in the viewing area of the camera 5.

The light source controller 4 may be implemented in any suitable manner. The light source controller 4 may, for instance, be connected to the camera controller 3 and the communication unit 2. In FIG. 1, for instance, a first controller input 40 is connected to a control output 30 of the camera controller 3. A second controller input 41 is connected to a control output 20 of the communication unit 2. Via the controller inputs 40, 41, the light source controller 4 may receive signals from the camera controller 3 and the communication unit 2 containing information about the operation of the camera 5 and the communication unit 2. The light source controller 4 may for example control the amount of current used by the light source 6 based on the received signals or any other parameter of the light source 6 suitable for the specific implementation.

The light source controller 4 may, for example, receive information about the mode of the camera 5 and/or the communication unit 3 and compare the receive information with one or more control criteria. Based on the comparison, the light source controller 4 may control the light source 6. For example, the light source controller 4 may control the mode of the light source 6. For example, the light source controller 4 may switch the light source 6 from a first mode to a second mode based on the comparison. The light source controller 4 may for example be arranged to switch the light source 6 from an on-mode to an off-mode, or vice versa, depending on the signals received from the camera controller 3. The light source controller 4 may for example switch the light source 6 on when the camera 5 capture an image and switch the light source off when the camera 5 is not operating.

In the on-mode, the light source 6 may for example be switched between states in which differing intensities of the light emitted by the light source 6 depending on the state of the communication unit 2. Thereby, excessive power consumption by the mobile communications device 1 can be prevented effectively, since the communication unit 2 consumes a significant amount of power during the transmitting state and the power consumption of the light source 6 corresponds to the brightness of the light source 6. The light source controller 4 may for example switch the light source 6 from an intense mode to a less intense mode, in which less light is emitted by the light source 6 but the light source is still emitting light, when the communication unit 2 switches from the receiving state to the transmitting state (and switch the light source 6 from the less intense mode to the intense mode when the communication unit 2 switches from the transmitting state to the receiving state). The light source 6 may for example be in a flash mode when the communication unit 2 is in the receiving state and be set in a video mode when the communication unit 2 is in the transmitting state.

The transmitting state may for example have duration in time which is less than a time required to capture an image with the camera 5. For example, the camera 5 may be able to capture between 10 and 50 images per second (fps), for example 15 of 30 fps. The communication unit 2 may alternate between the receiving state and the transmitting state with a period of 10 ms or less, such as 4 ms. The communication unit 2 may for example alternate between the transmitting state and the receiving state, with a duty cycle of 50% or less and/or above 12.5%. The communication unit 2 may alternate between the receiving state and the transmitting state in cycles of 10 ms or less, such as 4 ms. During a cycle the communication unit 2 may for example be in the transmitting state for a period in the range from 0.5 milliseconds (ms) to 2 ms and/or be in the receiving state for a period in the range from 2 ms seconds to 3.5 ms.

The light source 6 may be implemented in any suitable manner. The light source 6 may, as shown in FIG. 1 for example, include a light emitting diode (LED) which is connected with anode contact 60 to the light source controller 4 and with a cathode contact 61 to ground GND. The light source 6 may for example be operated as a flash light or as a continuous light source. For instance, when the camera 5 is used to capture a single image, the light source may be operated as a flash light and when the camera 5 is used to capture a sequence of images, i.e. a video, the light source 6 may be operated as a continuous light source. For example, the light source 6 may include a LED which uses a current of about 200 mA when operated as a continuous light source and in the range from 1 A up to and including about 1.5 A when used as a flash light, with a supply voltage in the range of 0.38 V to 4 V.

FIG. 2 shows another example of a mobile communication device 100. The mobile communication device 100 may, as shown in FIG. 2, include a power source 10 connected to the communication unit 2 and the light source 6. The power source 10 may for example be a voltage source or a current source. The power source 10 may for instance be a DC power source, such as a battery, a lithium-based chemical battery for example. The communication unit 2 and the light source 6 may for instance use the same power source 10. The power source 10 may provide power to the communication unit 2 and the light source 6. In the example of FIG. 2, the light source 6 is connected to the power source 10 via the light source controller 4. More in particular, a current input 60 of the light source 6, in this example a light emitting diode, is connected to a power output 43 of the light source controller 4. A current output 61 of the light source 6 is connected to ground GND. A current input 44 of the light source controller 4 is directly connected to the power source 10.

In the example of FIG. 2, the back light 14 is also connected to the power source 10 via the light source controller 4. More in particular, a current input 140 of the back light 14, in this example a light emitting diode, is connected to a power output 43 of the light source controller 4. A current output 141 of the back light 14 is connected to ground GND.

The light source controller 4 may be connected to a power input of the communication unit 2 and may be arranged to control the light source 6 and/or the backlight 14 based on a consumption of power from the power source by the communication unit 2. In the example of FIG. 2, for instance, the communication unit 2 includes a power amplifier 24 and a modem 23. In this respect it should be noted, the term 'modem' as used in this application refers to a device which converts a received signal into a form suitable for a communication system. The modem may, for example, convert a received signal into a form suitable to be processed by upper layers of a communication protocol. The modem may, for example, use hardware resources, such as one or more processors and memories to perform demodulation, decoding functions and to process low level protocol layers and may execute software.

The modem 23 may, for example, receive signals (to be sent to another device) from a base-band unit 8 connected with a base-band output 80 to a modem input 230. The base-band unit 8 may for instance present a base-band signal to the modem input 230. The modem 23 may convert the base-band signal into a signal suitable to be transmitted over the connection. The modem 23 may for example convert the base-band signal into a modulated signal with a carrier frequency different from the frequency of the base-band signal, and present the signal to a signal input 240 of the power amplifier 24, to transmit the signal to another device via the antenna 7.

Figure 3:
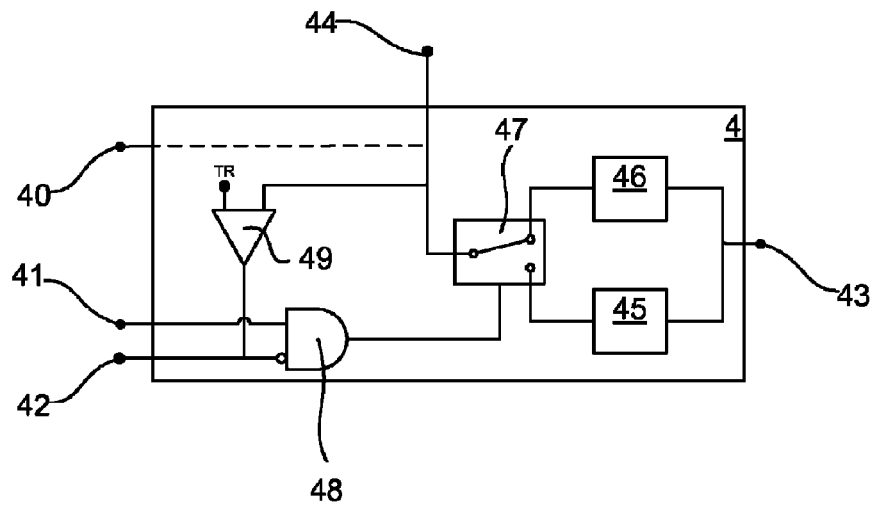
FIG. 3 schematically shows a block diagram of an example of an embodiment of a light source controller.

The modem 23 may further control the power provided to the power amplifier 24, and hence the power consumption thereof. The modem 23 may, as shown in FIG. 2, for example have a power control output 234 connected to an on/off contact 244 of the power amplifier 24. Via the on/off contact 244 the power amplifier 24 can be switched on or off by either providing a high voltage or a low voltage. The modem 23 can control the voltage of the on/off contact 244, and hence switch the power amplifier 24 on or off. The modem 23 may for example switch the power amplifier 24 on, and hence into a transmitting state by setting the voltage to a high voltage and switch the amplifier 24 off by setting the voltage to a low voltage. In the example of FIG. 2, the light source controller 4 is connected with a third controller input 42 to the on/off contact 244. The light source controller 4 can thus sense the voltage supplied to the on/off contact 244 and hence control the light source 6 based on the state of the power amplifier 24. The light source controller 4 may, as shown in FIG. 3 for example, include power supply control units 45,46 which connect the light source 6 to the power supply 10 and control the power supply control units 45,46 based on the voltage supplied to the power amplifier, as is explained below in more detail with reference to FIG. 3.

The power amplifier 24 may further have one or more (two in FIG. 2) signal inputs 240,241. At the signal inputs 240,241 one or more signals to be amplified may be presented. The power amplifier 24 is connected with a signal output 242 to the signal output 21, and hence to the antenna. The amplifier 24 can present an amplifier signal to the antenna 7, in order to transmit the signal to another device via a wireless connection. The signal inputs 240,241 may, as shown in FIG. 2, be connected to signal outputs 231, 232 of the modem 23 and the modem 23 may generate and present the signals to be amplified to the signal input(s) 240,241.

The power amplifier 24 may, as shown in FIG. 2, be connected with a power supply contact 243 to the power supply 10. Between the power supply 10 and the power amplifier 24 a voltage converter 25 may be present. In the example of FIG. 2, for instance, a voltage converter 25 is connected with a low voltage contact 251 to the power source 10 and with a high voltage contact 250 to the power amplifier 24. The voltage converter 25 can convert the voltage provided by the power source 10 to a higher voltage, for example from a voltage below 5 V, such as 3.7 V, to a voltage above 10 V, such as 12 V or 15 V. In the example of FIG. 2, a converter control contact 252 of the converter 25 is connected to a converter control output 233 of the modem. Via the converter control contact 252, for example, the voltage conversion ratio may be controlled.

The light source controller 4 may include a first controller input 40 connected to the camera controller 3. In the example of FIG. 2, the first controller input and the second controller input 41 are connected to a processor 8. The processor 8 is connected with a supply 85 to the power source 10. The processor 8 is connected with an input/output 80 to the communication unit, to receive or transmit signals from and to the communication unit. The processor 8 is further connected with a first light source control output 81 to the first controller input 40 of the light source controller 4. A second light source control output 82 of the processor 8 is connected to the second controller input 41 of the light source controller 4. At the first light source control output 81, the processor 8 can output a signal which controls the mode of the light source, e.g. on or off. For example, when the camera 5 captures an image, the mode may be controlled to be the on-mode whereas the mode may be set to be the off-mode when the camera 5 does not capture an image. At the second light source control input 82, a signal can be presented which controls the state of the light source, e.g. high level of light or low level of light. For example, when the camera is used as a video camera, the level of light may be controlled by the processor 8 to be low, and in case the camera is used as a photo camera, the level of light may be controlled to be high.

In the example of FIG. 2, a camera control output 83 of the processor is connected to the control input 30 of the camera controller 3. The processor 8 may for example transmit to the camera controller 3 a start signal in response to which the camera controller 3 starts generation of an image and/or receive from the camera controller 3 data representing one or more images and output the images, for example at a (not shown) user interface in a for humans perceptible form. When the start signal is being sent, or slightly prior thereto, the processor 8 may e.g. set light source 6 in the on-mode via the first light source control output 81.

In the example of FIG. 2, a communications input/output 84 of the processor 8 is connected to an input/output 90 of a voice communication processor 9. The voice communication processor 9 is connected to a microphone 11 and to a speaker 12, via respective signal inputs/outputs 91,92. The voice communication processor 9 can control the microphone 11 and the speaker 12 and process signals received from the microphone or to be outputted at the speaker 12.

Referring to FIG. 3, the light source controller 4 may be connected with the first controller input 40 to the first light source control output 81. Via the first controller input 40, the mode of the light source can be controlled, e.g. on or off, as shown in table 1. As shown in FIG. 3, the light source controller may include a comparator unit. The comparator unit may compare the signal at the second controller input and the signal at the third controller input with a light source control criterion, which comparator unit may be further connected to the controller output, for controlling the light source based on a result of the comparison.

In the example of FIG. 3, for example, the comparator includes a logic exclusive AND (XAND) gate 48. The XAND gate 48 is connected with an input to the second controller input 41 and with an inverted input to the third controller input 42. The XAND gate 48 is connected with an output to a control input of a switch 47. The switch 47 connects a power supply port 44, which can be connected to the power source 10, to a selected one of power supply control units 45,46. The power supply control units 45,46 are connected to the power output 43. The power supply control units 45,46 each provide a different amount of power to the power output 43, and hence to the light source. The state of the switch 47 is controlled by the signal presented at the switch control input, and hence by the output of the XAND gate 48. Depending on the state of the switch 47, the power supply control unit 45 or the other power supply unit 46 is connected to the power supply and hence either a first current or a second current is supplied to the light source 6. Table 1 is a truth table which lists the state and mode of the light sources 6 and the state of the backlight 14 as a function of the signal presented at the inputs 40-42.

TABLE 1

| input 40 | input 41 | input 42 | light source 6 | light source 6 | back light 14 |
|---|---|---|---|---|---|
| 1 | 1 | 1 | ON | low | high |
| 1 | 1 | 0 | ON | low | low |
| 1 | 0 | 1 | ON | low | high |
| 1 | 0 | 0 | ON | high | low |
| 0 | 1 | 1 | OFF | — | high |
| 0 | 0 | 1 | OFF | — | high |
| 0 | 1 | 0 | OFF | — | low |
| 0 | 0 | 0 | OFF | — | low |

The controller 4 may include a comparator 49 for sensing comparing a parameter forming a measure for an amount of energy available from the power source 10 with a predetermined control criterion and controlling the state of the component based on the comparison. In the example of FIG. 3, for instance, the input 44 forms a sensing contact and is connected to an input of a comparator 49. The comparator 49 can compare the voltage at the input with a threshold voltage TR at reference input. The comparator 49 may for example output a logical true signal (e.g. a 1) in case the voltage at the input is higher than the threshold voltage and output a logical false signal (e.g. a 0) in case the voltage at the first input is lower than the threshold voltage. As shown in FIG. 3, the comparator 49 may for example be connected to the input 42, and hence control the switch as explained above. Thereby, in case the supply voltage of the power source 10, which may for example be a battery, becomes below the threshold voltage, the light source 6,14 may be switched to a lower consumption mode. Since the supply voltage forms a measure for the energy in a battery, and typically reduces when the battery is almost empty, the lifetime of the power source can be extended.

The camera 5 may be any suitable type of camera. In the example of FIG. 1, for instance, the camera is a digital camera. The digital camera may, as shown, include a matrix-like sensor which includes a plurality of a sensor elements 51-5i arranged in rows and columns, such as charge coupled device sensors, complementary metal-oxide semiconductor (CMOS) sensors or another suitable type of photo-sensor. As shown in FIG. 1, the camera 5 may include a lens 51 or other optical element which projects light onto the matrix of sensor elements 51-5i. For illustrative purposes, in FIG. 1 a line-shape arrangement of five sensors is shown and in FIG. 2 a two-dimensional matrix arrangement of five-by-five sensors is shown. However the matrix arrangement may include any suitable number of n by m sensors, with m equal or different to n. The matrix may for example be an array of more than 500 pixels by more than 400 pixels, 640 by 480 pixels or 2048 by 1536 pixels. The arrangement may for example be rectangular and for example have a length:width ratio of 1.25 or more, such as 1.33 or more, for example 1.77 or more.

The camera controller 3 may be implemented in any suitable manner. The camera controller 3 may for example be arranged to send the captured image to another device. In the example of FIG. 1, for instance, the camera controller 3 is connected with an image output 33 to an image input 22 of the communication unit 2. The camera controller 3 can send data representing the captured image to the communication unit 2, via the image output 33 and the image input 22. The communication unit 2 may subsequently transmit the data to another device, for example via the antenna 7 and a wireless connection to the other device. However, the image may also be captured for different purposes, and for example be stored in a (not shown) memory in the mobile communications device 1 or be outputted on a (not shown) display.

The light source controller 4 may for example control the light source to be in the on-mode during a period of time longer than inverse of the number of images the camera can capture per seconds, for example about two times or more than two times that period. Thereby, the light source is controlled in a manner which may be used to project light on an object of which camera without mechanical shutter, such as a so-called rolling-shutter camera, captures an image. In table 2, examples of values for the duration of the flash light are listed as a function of the number of frames the camera may capture.

TABLE 2

| Camera speed equal or larger than: (frames per second) | Time of flash equal or larger than: (ms) |
| --- | --- |
| 7.5 | 272 |
| 10 | 205 |
| 15 | 138 |
| 20 | 105 |
| 25 | 85 |
| 30 | 72 |

Figure 4:
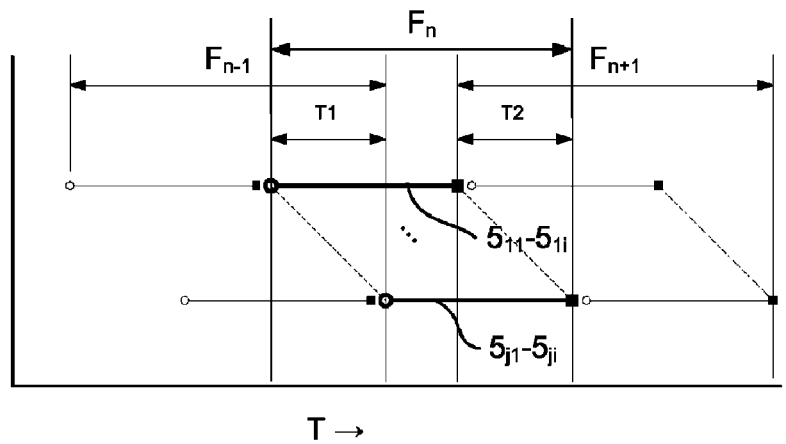
FIG. 4 schematically illustrates, by way of example, a method of capturing an image which may for instance be performed by the example of FIG. 2.

FIG. 4 schematically illustrates generation of an image with a rolling-shutter camera. A rolling-shutter camera may include a matrix arrangement of photo-sensitive sensor elements 51-5i, as e.g. shown in FIGS. 1 and 2. When capturing an image, a sub-image is captured per line of the matrix and the sub-images are combined thereafter into the complete image. More in particular, a line-shaped subgroup of photo-sensitive cells is activated, the light is projected onto the cells 51-5i in the respective line during an exposure period. Following the exposure time, the sensor elements are read out and the sensor elements are reset to provide a defined exposure time. Using a data-processing unit, for example the camera controller 3, which has suitable means of processing such as, for instance, means of digitizing, storing, calculation, etc., an image can be produced from the read lines. As is illustrated in FIG. 4, the camera may capture an image Fn which may be part of a sequence of images . . . , Fn−1, Fn, Fn+1, . . . or be a single separate image. As illustrated, when capturing the image Fn, the line of sensor elements denoted 511-5i1 is first activated, exposed and readout. Thereafter, the process is repeated with a following line 512-5i2, etc., until the last line of elements denoted 51j-5ij in FIG. 2 is activated, exposed and readout. In the example of FIG. 4, the lines are read after each other in the period of time denoted T2, but the processes for the lines have an overlap in time. The last line is activated a period of time T1 after activation of the first line.

Figure 5:
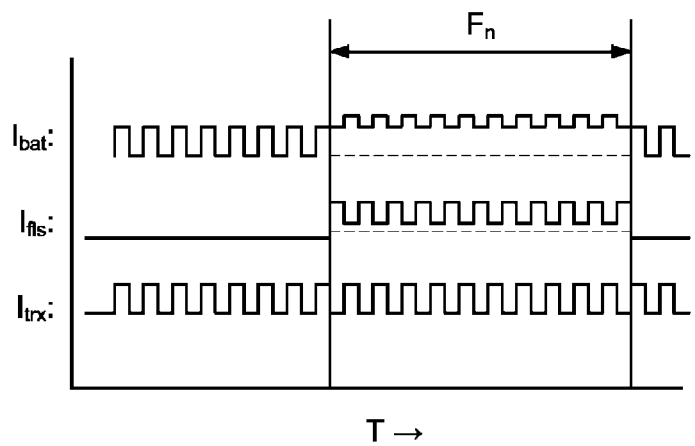
FIG. 5 schematically shows, by way of example, a timing diagram which may, for example, be used by the example of FIG. 1.

FIG. 5 schematically illustrates the current Ibat provided by the power source 10, the current Ifls used by the light source 6 and the current Itrx used by the communication unit 2 in the communicating mode. For illustrative purposes, the graphs have not been drawn to scale to help improve the understanding of the embodiments of the present invention. As shown, the communication unit 2 may switched in the communicating mode between a transmitting state in which a high amount of current, for example more than 0.5 mA, such as 1.5 mA, or more, is used by the communication unit 2 and a receiving state in which a low amount of current is used by the communication unit 2 for example less than 0.4 mA such as 0.3 mA. The switching between the transmitting state and the receiving state may for example have a period which is less than the time required to capture an image, for example less than 5 ms, such as 4.6 ms. The switching may for example which is less than the time required to activate, expose, read and reset a line of a sensor elements 51j-5ij. The ratio of the switching period relative to time required to activate, expose, read and reset a line may for example be in the range of 1:20 to 1:5. The light source 6 is switched to an on-mode when the camera 5 starts capturing the image Fn, and switched to off-mode when the last line of elements denoted 51j-5ij has been read out. In the on-mode, the light source 6 is switched between the high state and the low state when the communication unit 2 is switched between the transmitting state and the receiving state. Accordingly, as shown in FIG. 4, the current provided by the power source 10 remains relatively low.

The invention may be implemented as a kit. The kit may be provided as a set of separate components which can be connected to each other to assemble a module operating as controller 4, or may be provided as an assembled module of components connected to each other in a suitable manner.

The invention may also be implemented in a computer program for running on a computer system, at least including code portions for performing steps of a method according to the invention when run on a programmable apparatus, such as a computer system or enabling a programmable apparatus to perform functions of a device or system according to the invention. Such a computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, other components, such as the speaker 12 or the voice communication processor 9, may be controlled based on the operation of the communication unit 2 and for example be switched on or off depending on the state of the communication unit 2.

For example, it should be understood that all circuitry described herein may be implemented as one or more integrated circuits, for example implemented in silicon or another semiconductor material or alternatively be implemented as a software code representation of one or more integrated circuits or parts thereof.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the light source controller 10 and/or the communication unit 2 may be implemented as suitably connected discrete semiconductor components.

Also, devices functionally forming separate devices may be integrated in a single physical device. For example, the base-band unit 8, the light source controller 4, and the voice communication processor 9 may be integrated into a single processor.

Furthermore, the mobile communications device may, for example, be a mobile telephone, a personal digital assistant, a camera provide with a wireless communication unit to enable transmission of captured images or video to, e.g., a person computer or another type of mobile communication device.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'one or more', and do not exclude a plurality. The mere fact that certain measures are recited in mutually different claims does not indicate that a combination of these measures cannot be used to advantage.

The invention claimed is:

1. A mobile communications device, comprising:
   a communication unit for communicating with another device;
   a camera for capturing an image of an object;
   a camera controller for controlling said camera; and
   a light source for illuminating said object in order to enable the camera to capture an amount of light sufficient to capture the image;
   a light source controller having a controller output connected to said light source, for controlling said light source,
   wherein the light source controller is connected to said communication unit and said camera controller, for controlling, when said camera is capturing an image of an object and said communication unit is in said communicating mode, said light source to emit light having an intensity which is sufficient to provide an effective illumination of the object and which depends on the power consumption of the communication unit; and wherein said light source controller is connected to an control output of said communication unit, for determining a state of said communication unit and to a control input of said light source for changing a state of said light source from a first state to a second state at which said light source has a lower energy consumption than in said first state when said communication unit enters into a predetermined state during at least a part of said communicating mode.

2. A mobile communications device as claimed in claim 1, wherein, during said communicating mode a communication channel is established between the communication unit and said other device, and in said communicating mode, the communication unit can be in a transmitting state in which said communication unit transmits signals to said other device over said communication channel or in a non-transmitting state in which the communication unit does not transmit signals to said other device over said communication channel.

3. A mobile communications device as claimed in claim 1, wherein said light source controller includes:
   a comparator connectable to a power source, for comparing a parameter forming a measure for an amount of energy available from the power source with a predetermined control criterion and controlling the state of the light source based on the comparison.

4. A mobile communications device as claimed in claim 2, wherein said light source controller is arranged to control said light source to be in a first state when said communication unit is in the transmitting state, and control said light source to be in a second state when said communication unit is in the non-transmitting state, in which first state said light source emits less light than in said second state.

5. A mobile communication device as claimed in claim 4, wherein when said communication unit is in said communicating mode, the communication unit alternates between said transmitting state and said non-transmitting state, and said transmitting state has a duration less than a time required to capture an image with said camera.

6. A mobile communications device as claimed in claim 4, wherein said light source controller is arranged to switch said light source between a video mode and a flash light mode.

7. A mobile communication device as claimed in claim 4, including a connect for a power source, for providing power to said communication and wherein said light source controller is connected to a power input of said communication unit and is arranged to control said light source based on a consumption of power from said power source by said communication unit.

8. A mobile communication device as claimed in claim 7, wherein said light source controller is arranged to control said light source to be in said second state when said communication unit uses a first amount of power and said second state when said communication unit uses a second amount of power, said second amount of power being higher than said first amount of power.

9. A mobile communications device as claimed in claim 5, wherein said communication unit alternates with cycles of 10 ms or less and said camera is able to capture between 10 and 50 images per second.

10. A mobile communications device as claimed in claim 1, wherein said light source controller is arranged to control said light source in a first mode when said camera captures an image of said object and to control said light source to be in a second mode when said camera does not capture an image.

11. A mobile communication device as claimed in claim 1, wherein in said first mode said light source can be in a first state or in a second state, in which first state and second state said light source emits light but less light in the first state than in said second state.

12. A mobile communications device as claimed in claim 10, wherein said first mode is a light emitting mode and said second mode is an off-mode.

13. A mobile communications device as claimed in claim 11, wherein during said communicating mode a communication channel is established between the communication unit and said other device, and in said communicating mode the communication unit can be in a transmitting state in which said communication unit transmits signals to said other device over said communication channel or in a non-transmitting state in which the communication unit does not transmit signals to said other device over said communication channel; and
  wherein said light source controller is arranged to control said light source to be in the first state when said communication unit is in the transmitting state, and control said light source to be in the second state when said communication unit is in the non-transmitting state.

14. A mobile communications device as claimed in claim 1, wherein said light source controller includes:
  a first controller input connected to said camera controller;
  a second controller input connected to said communication unit; and
  a comparator unit connected to said first controller input and said second controller input, for comparing at least one signal received at said first controller input and at least one signal received at said second controller input with at least one light source control criterion, which comparator unit is further connected to said controller output, for controlling said light source based on a result of said comparison.

15. A mobile communication device as claimed in claim 1, wherein said camera is rolling shutter camera.

16. A mobile communications device as claimed in claim 1, wherein, during said communicating mode, the communication unit can be in a transmitting state in which said communication unit transmits signals to said other device or in a non-transmitting state in which the communication unit does not transmit signals to said other device.

17. A mobile communications device as claimed in claim 1, wherein said light source controller includes:
  a comparator connectable to a power source, for comparing a parameter forming a measure for an amount of energy available from the power source with a predetermined control criterion and controlling the state of the light source based on the comparison.

18. A light source controller for a mobile communications device comprising a communication unit for communicating with another device in a communicating mode; a camera for capturing an image of an object; a camera controller for controlling said camera, and a light source for illuminating an object in order to enable said camera to capture an amount of light sufficient to capture the image, said light source controller comprising:
  a controller output connectable to a light source a communication unit for communicating with another device in a communicating mode;
  the light source controller being connectable to said communication unit and said camera controller, for controlling an emission of light be said light source during at least a part of time said communication unit is in a communicating mode, based on an operation of said communication unit and on an operation of said camera,
  wherein said light source controller is arranged to control, when said camera is capturing an image of an object and said communication unit is in said communicating mode, said light source to emit light having an intensity which is sufficient to provide an effective illumination of the object and which depends on the power consumption of the communication unit, and
  wherein said light source controller is connected to an control output of said communication unit, for determining a state of said communication unit and to a control input of said light source for changing a state of said light source from a first state to a second state at which said light source has a lower energy consumption than in said first state when said communication unit enters into a predetermined state during at least a part of said communicating mode.

19. A method for controlling a mobile communications device, including:
  communicating by a communication unit in the mobile communication device with another device;
  capturing an image of an object with a camera in the mobile communications device while illuminating said object by a light source with an amount of light sufficient to capture the image;
  controlling said light source, when said camera is capturing an image of an object and said communication unit is in said communicating mode, to emit light having an intensity which is sufficient to provide an effective illumination of the object and which depends on the power consumption of the communication unit;
  determining a state of said communication unit;
  changing a state of said light source from a first state to a second state at which said light source has a lower energy consumption than in said first state when said communication unit enters into a predetermined state during at least a part of said communicating mode.

* * * * *